United States Patent Office 3,549,589
Patented Dec. 22, 1970

3,549,589
COLOR STABILIZED INTERPOLYMERS OF ETHYLENE AND VINYL ACETATE
Edmund R. Meincke, Cuyahoga Falls, Ohio, assignor to The General Tire & Rubber Company, a corporation of Ohio
No Drawing. Filed Oct. 25, 1968, Ser. No. 770,814
Int. Cl. C08f 45/60; C09d 5/02
U.S. Cl. 260—45.8       9 Claims

ABSTRACT OF THE DISCLOSURE

Interpolymers of ethylene and vinyl acetate containing 75–90 parts by weight of vinyl acetate and which may contain small amounts of other copolymerized material, e.g., acrylic acid, are stabilized against heat or age discoloration by the addition in amounts of about 0.1 to 5 parts by weight, per 100 parts by weight of the interpolymer, of a nitrogen containing organic substance having either (a) carbamide group (—NH—CO—NH—), e.g., urea, (b) carbamamidine group (—NH—CNH—NH—), e.g., dicyanamide, or (c) thiocarbamide group (—NH—CS—NH—)

e.g., thiourea. The resulting stabilized interpolymers are usable in the form of latices as coatings and adhesives as well as in the form of dry powders for molding, cements, calendered sheets, etc.

BACKGROUND OF THE INVENTION

Interpolymers of ethylene and vinyl acetate containing a major portion of vinyl acetate find widespread commercial application both in the form of latices and as dry polymers in the form of powders, granules or the like. In some cases, the interpolymers may contain small percentages of other copolymerizable materials to improve the freeze-thaw stability of the latices, to increase adhesive qualities of the interpolymers to certain substrates or for other purposes. The invention described herein is specifically concerned with ethylene-vinyl acetate interpolymers which comprise from about 25 to 10 parts by weight of ethylene and from 75 to 90 parts by weight of vinyl acetate and up to about 10 parts by weight of some other copolymerizable material.

Interpolymers of this type have been found useful for a number of purposes. In the form of latices, they are particularly useful as coating materials. For example, they may be applied to paper to increase water resistance, or, using appropriate amounts of clay and conventional paper-coating techniques, papers having glossy finishes can be obtained. Further, the interpolymers can be used as adhesives to secure paper, textile, vinyl plastic sheets or films to fabrics, metal foil, galvanized steel and other metal sheets or plates, plywood or similar panels. Additionally, the interpolymers find widespread use in the making of paints for exterior or interior use. In the form of dry powders or granules, the interpolymers can be used in molding, as cements, for calendering into sheets or films and for other purposes for which thermoplastic resins are known to be useful.

Interpolymers of the stated type possess a tendency to discolor on aging. This discoloration can occur at ambient temperatures but is accentuated by heat. Although the discoloration tendency appears to be characteristic of ethylene and vinyl acetate interpolymers of the stated class generally, the discoloration problem is particularly prevalent with interpolymers which have been prepared at low temperature (0–5° C.) using iron chelates as activators for the polymerization of the ethylene and vinyl acetate. This class of interpolymers would find greater acceptance by potential users and utilization of the interpolymers would unquestionably increase if an effective and economical means was available for mitigating or completely eliminating tendency of the interpolymers to discolor on aging or heating.

The discoloration of vinyl chloride polymers has long been recognized as a serious problem in the utilization of such polymers and extensive research and development has been directed to the elimination of discoloration or other degradation of vinyl chloride polymers. It has been quite well established that with PVC discoloration occurs when hydrogen chloride is eliminated from the polymer molecule with the formation of double bonds in the polymer. Accordingly, effective control of discoloration in PVC has been obtained by admixture with the polymers of chemicals which inhibit such hydrogen chloride elimination or effectively inactivate hydrogen chloride which may be eliminated during aging or heating of the polymer. For such purposes, metal compounds such as those containing tin, barium and cadmium have been found effective to control discoloration in vinyl chloride polymers. Similarly, antioxidants have also been found useful. Such techniques have been attempted with the ethylene and vinyl acetate interpolymers with which the present invention is concerned but have been found ineffective in reducing or eliminating discoloration of such interpolymers. Accordingly, it is concluded that discoloration in the ethylene and vinyl acetate interpolymers is not due to a mechanism similar to that experienced in vinyl chloride polymers, i.e., the splitting off of acetic acid to form conjugated double bonds. It has been reported that decomposition of polyvinyl acetate with resulting discoloration may involve the cleavage between oxygen and carboxyl carbon of the acetate side chain to form acetaldehyde and polymeric ketone. Multiple ketone groups adjacent to each other which would result in such a decomposition mechanism are known to be the source of color in organic compounds. Simple compounds which show this property are diacetyl which is yellow in color and triketopentane which is yellow-orange in color (see Trans. Farady. Soc., 48, 379 (1952)).

Over the thirty or more years during which vinyl chloride resins have been known and extensively used commercially, probably every known general class of chemical compound has been tested for possible use as stabilizing agents for the resins against decomposition or discoloration. Amido compounds have been extensively investigated for this purpose, e.g., see U.S. 2,588,899, 2,654,680 and 2,781,330. This has included the discovery that urea and substituted urea compounds may be used to stabilize vinyl halide resins against destructive effects of iron (see U.S. 2,103,581 and 2,899,398). The stabilization of vinyl halide polymers by the amido compounds results, as in the case of heavy metal compounds, antioxidants and the like in preventing the splitting off of hydrogen chloride or eliminating its destructive effects once split off from the polymer molecule and it has been shown that the ability of various stabilizing agents to accomplish this may be vitally affected by the nature and presence of other materials present in the polymer composition (see U.S. 2,899,398).

OBJECTS

A principal object of this invention is the provision of methods for stabilizing ethylene and vinyl acetate interpolymers against discoloration on aging or heating. Further objects include the provision of:

(1) A class of compounds useful as stabilizing agents to prevent the discoloration on aging or heating of ethylene and vinyl acetate interpolymers containing from about 25 to 10 parts by weight of ethylene and from 75 to 90 parts by weight of vinyl acetate.

(2) Information on discoloration of ethylene and vinyl acetate interpolymers, particularly those prepared using iron compounds as activators for polymerization, against discoloration on aging and heating.

(3) Plastic compositions comprising ethylene and vinyl acetate interpolymers and minute quantities of agents highly effective for stabilizing the interpolymers against discoloration.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

SUMMARY OF THE INVENTION

These objects are accomplished according to the present invention by incorporating in interpolymers of ethylene and vinyl acetate comprising from about 10 to 25 parts by weight of ethylene and from 90 to 75 parts by weight of vinyl acetate from about 0.1 to 5 parts by weight per 100 parts by weight of the interpolymer of a nitrogen containing compound of the formula:

or

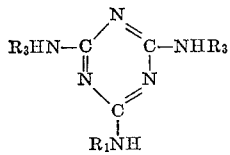

wherein:

X is a radical from the group =O, =S or =NH,
$R_1$ is hydrogen, $C_1$ to $C_{12}$ alkyl, $C_6$ to $C_{12}$ aryl or methylol,
$R_2$ is hydrogen, $C_1$ to $C_{12}$ alkyl, amino, cyano, or methylol, and
$R_3$ is hydrogen, $C_1$ to $C_{12}$ alkyl or methylol.

As one preferred class of compounds effective as color stabilizing agents for the stated ethylene and vinyl acetate interpolymers are carbamide group containing compounds of the formula:

$$R_1NH-CO-NHR_2$$

wherein $R_1$ and $R_2$ have the meaning hereinbefore defined.

As a second class of compounds useful for stabilizing the stated interpolymers are those containing a carbamamidine group of the formula:

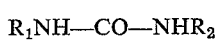

wherein $R_1$ and $R_2$ have the meaning hereinbefore defined.

As a third class of compounds useful in providing the color stabilization of the invention for the ethylene and vinyl acetate interpolymers are those containing a thiocarbamide group of the formula:

wherein $R_1$ and $R_2$ have the meaning hereinbefore defined.

Interpolymers which may be effectively stabilized against discoloration in accordance with the invention include copolymers consisting of ethylene and vinyl acetate in the proportions stated as well as interpolymers containing up to about 10 parts by weight of other copolymerizable material per 100 parts by weight of the interpolymer, particularly acrylic type compounds such as acrylic acid or acrylic esters.

The exact mechanism by which the nitrogen containing compounds of the class hereinbefore defined stabilize the ethylene-vinyl acetate interpolymers against discoloration has not been proven. However, since the materials which have been found effective for this purpose react readily with aldehydes and ketones, it appears that the stabilizing agents may react with multiple, adjacent ketone groups which are produced in the polymer structure by cleavage between oxygen and carboxyl carbon in the acetate side chain of the interpolymers. These adjacent multiple ketone groupings are color-forming groups whereas amido reaction products of such ketone groupings with stabilizing agents of the class hereinbefore defined are colorless. This mechanism of color stabilization of the interpolymers is further supported by the discovery in the course of the present invention that if all of the hydrogens of urea or the other stated nitrogen containing compounds are replaced by either alkyl groups or methylol groups no stabilization against discoloration is obtained. Such totally substituted compounds would not be capable of reaction with ketone groups which might be generated in the interpolymers. Similarly, if one of the hydrogens of each of the nitrogen atoms in compounds of the class hereinbefore defined are replaced by negative groups such as the phenyl group, reaction with the ketone group would likewise be prevented. Such multi negative group substituted compounds have also been found ineffective as color stabilizing agents for the ethylene-vinyl acetate interpolymers. Further, as previously indicated, heavy metal containing compounds and antioxidants known to be useful in the color stabilization of vinyl chloride polymers have been found as a result of the present invention to be ineffective as color stabilizing agents for the ethylene-vinyl acetate interpolymers.

EXAMPLES

The following details of operation in accordance with the invention and reported data illustrate the further principles and practice of the invention to those skilled in the art. In these examples and throughout the remaining specification and claims, all parts and percentages are by weight unless otherwise specified.

Example 1

This example illustrates the preparation of an ethylene-vinyl acetate interpolymer of the type to be stabilized against discoloration in accordance with the invention.

An aqueous solution was prepared from the following ingredients in the parts indicated:

| | Parts |
|---|---|
| Water | 1197 |
| Ammonium persulfate | 3.75 |
| Sodium acetate | 7.5 |
| Hydroxy ethyl cellulose (1) | 3.0 |
| Sodium dihexyl sulfosuccinate (2) | 4.8 |

This solution was charged into a polymerization vessel equipped with internal agitator, pressure-tight closure, cooling jacket (in which cooling can be applied by refrigerated anti-freeze solutions) and valve fluid inlets. The closure was then clamped in position and the vapor space purged once with nitrogen gas. The agitator was then set in motion and the vessel pressurized with nitrogen to 25 p.s.i.g. Next, 150 parts of vinyl acetate monomer were pumped in, followed by the following aqueous solution:

| | Parts |
|---|---|
| Water | 15 |
| $FeSO_4 \cdot 7H_2O$ | 0.15 |
| Rochelle salt | 1.5 |
| SFS (3) | 0.375 |

The internal pressure was then raised with ethylene to 150 p.s.i.g. and charging of ethylene to the vessel was continued for the remainder of the polymerization at a rate required to maintain an internal vessel pressure of 150 p.s.i.g.

After one hour of reaction under constant agitation, addition of equal portions of a mixture of 1327.5 parts of vinyl acetate and 22.5 parts of acrylic acid was commenced at a rate to require 6 hours for the introduction of the entire amount of the mixture into the vessel. During this six-hour period, 12 parts of the following solution were added every one-half hour:

| | Parts |
|---|---|
| Water | 180 |
| $Na_2CO_3$ | 7.5 |
| SFS | 2.25 |

The following solution was also added in increments during this six-hour period:

| | Parts |
|---|---|
| Water | 30 |
| Ammonium persulfate | 1.0 |
| Sodium diamyl sulfosuccinate (4) | 1.0 |

One-half was added after 3 hours and one-half after five hours.

At the end of 7½ hours, the vessel was vented to atmosphere, after shutting off the flow of ethylene, and the resulting latex was discharged into a storage container. Standard evaluation tests on the polymer latex showed the polymer to have an inherent viscosity of 0.98 for a 1% solution in methyl ethyl ketone. The percent gel content in MEK was nil.

This operation represented a control polymerization at a temperature of 5° C.

In this example, several of the system components can be further identified as follows:

(1) Commercial product sold as "Cellosize WP-300" in a 2% aqueous solution of which 150 parts were used to provide 3 parts of active agent.
(2) Commercial product sold as "Aerosol MA" (80% solution in water-alcohol mixture).
(3) Sodium formaldehydesulfoxylate.
(4) Commercial product sold as "Aerosol AY."

The resulting interpolymer was analyzed and found to contain (by weight) 82.9% vinyl acetate units, 1.25% acrylic acid units and 15.85% ethylene units (by difference).

Example 2

The latex of Example 1 was divided into a number of separate portions and to each of these was added a nitrogen containing organic compound to serve as a color stabilizing agent for the interpolymer of the latex. One part of stabilizer was used for each 100 parts (dry weight basis) of interpolymer. The stabilizer was either dissolved or dispersed in water before addition to the respective latex portion. Following thorough mixing of the stabilizer and the latex, the mixture, in each separate case, was placed in an aluminum tray and evaporated to dryness at ambient temperature (15–20° C.). Then, the dried mixture in the tray was placed in a hot air circulating oven and heated for 2 hours at 150° C. Any color change produced in the heated mixtures was rated visually on an empirical scale rated 10 and the color of control polymer portions to which no stabilizer had been added being rated as 1, i.e., a dark brown color.

Results of this series of tests is reported in the following table.

TABLE I

| Test Number: | Compound used | Rating |
|---|---|---|
| 1A | None | 1 |
| 1B | Trimethylol melamine | 7 |
| 1C | Urea | 9 |
| 1D | Dicyandiamide | 7 |
| 1E | Thiourea | 9 |
| 1F | Guanidine | 7 |
| 1G | Melamine | 6 |
| 1H | Semicarbazide hydrochloride | 8 |
| 1I | Dimethylol urea | 7 |
| 1J | Dimethyl urea | 8 |
| 1K | Phenyl urea | 5 |
| 1L | None—not heated | 10 |

Example 3

In another case, the procedure of Example 2 was repeated with another series of amide compounds with the results listed in the following table:

TABLE II

| Test Number: | Compound used | Rating |
|---|---|---|
| 2A | Tetramethyl urea | 1 |
| 2B | Tetramethylol urea | 1 |
| 2C | Diphenyl urea | 1 |
| 2D | Hexamethylol melamine | 1 |

DISCUSSION OF DETAILS

The success of the present invention involves, at least in part, the discovery of a class of nitrogen-containing compounds which can effectively be used to mitigate or eliminate discoloration of ethylene-vinyl acetate interpolymers composed predominantly of vinyl acetate. The general class of compounds discovered in accordance with the invention for this purpose has been hereinbefore defined. A selected list of the nitrogen containing organic substances useable in carrying out the invention includes:

As carbamide group compounds, urea, dimethyl urea, dimethylol urea, ethyl methyl urea, phenyl urea, methyl phenyl urea, dihexyl urea, ethylene urea, dodecyl urea, methyl butyl urea, 1,3-propylene urea, butyl hexyl urea, methyl urea, tolyl urea, xylyl urea, p-hexyl phenyl urea, stearyl urea, 1-naphthyl urea, methyl decyl urea, semicarbazide and 1-phenyl semicarbazide.

As carbamamidine group compounds, melamine, guanidine, dicyandiamide, s-trimethyl melamine, s-trimethylol melamine, methyl melamine, diethyl melamine, phenyl melamine, s-trihexyl melamine, 1-amino guanidine, 1-phenyl guanidine, 1,3-dimethyl guanidine, 1-ethyl, 3-octyl guanidine, and 1-carbamyl-3-methyl guanidine.

As thiocarbamide group compounds, thiourea, dimethylol thiourea, dimethyl thiourea, phenyl thiourea, m-tolyl thiourea, diethyl thiourea, methyl thiourea, benzyl-thiocarbamide and 1-methyl-3-phenyl thiourea.

There are many commercially available products which contain one or more of the foregoing types of compounds as major components or as commercial grade products. Products of this type may be effectively used instead of chemically pure substances. An example of such a commercial grade product is "Uformite MM55."

In addition to such compounds per se, acid salts thereof may be used, e.g. guanidine carbonate, guanidine hydrochloride, guanidine nitrate, semicarbazide hydrochloride, urea hydrochloride, urea nitrate, etc. Hence, where the compounds are mentioned herein or in the claims, such acid salts are encompassed as equivalents.

Mixtures of one or more of the foregoing compounds or other equivalent compounds within the class as defined may be used. In some instances, with interpolymers of particular composition or method of production, combinations of two or more of these compounds may be found more effective than an equivalent amount of a single compound. The amount of stabilizer added to the interpolymer for color stabilization may be varied to some extent and in part will depend upon the particular stabilizing agent or agent combination used. Broadly, from about 0.1 to 5 parts by weight, preferably from about 0.5 to 2 parts by weight, of the stabilizing agent per 100 parts by weight of the interpolymer on a dry weight basis have been found effective. While quantities less than the minimum stated may provide some detectable improvement, this ordinarily would not be sufficient for practical purposes. Conversely, addition of amounts greater than the stated maximum could be used, but no further improvement in color stabilization has been noticed when the amount is increased above about 5 parts by weight per 100 parts of interpolymer.

The nitrogen-containing organic compound of the class prescribed to be used as stabilizer can be admixed with the interpolymer in a variety of ways. The stabilizer can be added before or after polymerization although the latter is preferred particularly in the case of latex or suspension polymerizations in order to prevent the stabilizer from forming coagulum during the polymerization. Advantageously, the stabilizer is added before any steam stripping is applied to the polymer in its processing in order to prevent appearance of any color during this operation. Where the stabilizing agent is added as a component of the polymerization system in the emulsion or suspension polymerizations used in formation of the interpolymers, the stabilizer may be dissolved in a small quantity of water if it is soluble therein or suspended in water before addition to the polymerization system. Easy homogeneous admixture of the stabilizer with the ultimate interpolymer is obained in this manner. Alternatively, the stabilizer may be incorporated into the interpolymer in solid form either by milling, powder mixing or the like.

The stated interpolymers to which the stabilizing agents are added in accordance with the invention may be prepared by any suitable procedure known to the art. Emulsion or suspension polymerization techniques are particularly useful and interpolymers which have been improved in tensile strength and in molecular weight by progressive incorporation during polymerization into the monomer system of a small amount of water-soluble polyoxyalkylene compound are a specific type of interpolymer useable in accordance with the invention. Interpolymers of this type can be prepared by the methods as described in copending patent application Ser. No. 770,804 (now U.S. Pat. 3,516,975), of Edmund R. Meincke filed of even date herewith and entitled "Methods of Producing Improved Ethylene-Vinyl Acetate Interpolymers and Resulting Products," the disclosure of which is incorporated herein by reference.

The new polymerization procedures are useable for interpolymers formed only of ethylene and vinyl acetate within the stated proportions. However, the stabilizing agents may also be used with ethylene and vinyl acetate interpolymers that have been modified by the incorporation of additional copolymerizable materials in an amount advantageously of from about 0.1 to 10 parts by weight of added copolymerizable material for each 100 parts by weight of monomer mixture (interpolymer). For example, where the polymer emulsions resulting from the new procedures are to be used in the formation of interior or exterior paint, the inclusion of a small amount of acrylic acid as a copolymerized material serves to improve the freeze-thaw stability of the polymer latex. Inclusion of other unsaturated monocarboxylic acid copolymerizable materials may also be used for this purpose or to improve the adhesive qualities of the polymers to substrates or the like, for example, in an amount up to about 2 parts by weight per 100 parts by weight of monomer mixture (interpolymer). A selected list of copolymerizable materials which may be used in this manner in the formation of polymers in accordance with the invention include: vinyl chloride, methyl acrylate, ethyl methacrylate, vinylidene chloride, vinyl fluoride, fumaric acid, methacrylic acid, chloroacrylic acid, hydroxy ethyl acrylate, hydroxy ethyl methacrylate, sodium vinyl sulfonate, 2-sulfo ethyl methacrylate, itaconic acid, monoethyl maleate, monoethyl fumarate, dibutyl maleate, acrylonitrile, methacrylonitrile, and acrylamide.

The new interpolymers of ethylene and vinyl acetate of increased color stability produced by the invention may be used for any purpose for which prior known ethylene-vinyl acetate copolymers have been known to be useful. Since in the preferred embodiments of the inventions, the polymer products are obtained as stable emulsions or latices, they are useful in the making of paints for exterior or interior use. When modified by inclusion of small amounts, e.g., from about 0.1 to 1.5 parts by weight of acrylic acid per 100 parts by weight of monomer mixture (interpolymer), the resulting latices exhibit excellent freeze-thaw stability and films formed from the copolymers possess good water resistance and freedom from discoloration on heating. In forming latex paints, the new copolymers may be included in formulations containing resin extenders and they possess good compatibility with the usual paint pigments including titanium dioxide, calcium silicate, barium sulfate and the like.

Another use to which the new copolymers may be placed is in the coating of paper and textiles. Inclusion of various polar groups by copolymerization of minor quantities of polar group containing monomers as mentioned above are useful in making such coating compositions. Such polar groups may include the carboxyl, amide, hydroxyl and sulfonate groups. Coating compositions of this type may include water-soluble additives to aid in obtaining high pigment loading. Using appropriate amounts of clay and copolymer in conventional paper coating techniques, papers having slick finishes can be obtained. In the coating or other treatment of textiles, the new copolymer latices may be used in forming non-woven fabrics, producing upholstery backing and the like.

Another major category of use of the new copolymers is as adhesives to secure paper, textile, plasticized polyvinyl chloride or other plastic sheets to cloth, metal foil, metal sheets, galvanized steel, wood, paperboard and the like. Further adhesive uses would include production of plywood, book binding, paper saturation, production of boots and shoes and as an adhesive in combining polyurethane or other plastic foam scraps.

The new color stabilized interpolymers of the invention may be used as dry polymers instead of as aqueous emulsions or dispersions. As such, they are employable as plasticizers or extender resins for various plastics, including polyvinyl chloride, styrene-acrylonitrile polymers, polystyrene, nitrocellulose and the like, or in the production of caulking compounds and sealants. Further, they may be at least partially hydrolyzed to polymer materials containing polyvinyl alcohol components. Such hydrolyzed products find use in the formation of polyurethane foams and coatings, thermosetting coatings with aminoplasts, as shellac substitutes, and as paper coating resins.

The embodiments of the invention in which an exclusive property or privilege is claimed are defined as follows:

1. An interpolymer of ethylene and vinyl acetate comprising from about 25 to 10 parts by weight of ethylene and from 75 to 90 parts by weight of vinyl acetate stabilized against discoloration upon heating by containing homogeneously admixed therewith in an amount of from about 0.1 to 5 parts by weight per 100 parts by weight of said interpolymer of a nitrogen-containing organic compound of the formula selected from the group:

or

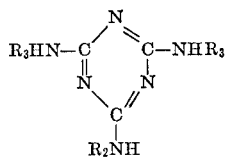

wherein:
X is a radical from the group =O, =S or =NH,
$R_1$ is hydrogen, $C_1$ to $C_{12}$ alkyl, $C_6$ to $C_{12}$ aryl or methylol,
$R_2$ is hydrogen, $C_1$ to $C_{12}$ alkyl, amino, cyano, or methylol, and
$R_3$ is hydrogen, $C_1$ to $C_{12}$ alkyl or methylol.

2. A polymer composition as claimed in claim 1 containing from about 0.5 to 2 parts by weight for each 100 parts by weight of said interpolymer of a carbamide group compound of the formula:

$$R_1NH\text{---}CO\text{---}NHR_2$$

wherein:
$R_1$ is hydrogen, $C_1$ to $C_{12}$ alkyl, $C_6$ to $C_{12}$ aryl or methylol, and
$R_2$ is hydrogen, $C_1$ to $C_{12}$ alkyl, amino, cyano or methylol.

3. A polymer composition as claimed in claim 1 containing from about 0.5 to 2 parts by weight for each 100 parts by weight of said interpolymer of a carbamamidine group compound selected from the group consisting of guanidine, melamine and dicyandiamide.

4. A polymer composition as claimed in claim 1 containing from about 0.5 to 2 parts by weight for each 100 parts by weight of said interpolymer of a thicarbamide group compound of the formula:

$$R_1NH\text{---}CS\text{---}NHR_2$$

wherein:
$R_1$ is hydrogen, $C_1$ to $C_{12}$ alkyl, $C_6$ to $C_{12}$ aryl or methylol, and
$R_2$ is hydrogen, $C_1$ to $C_{12}$ alkyl, amino, cyano or methylol.

5. An interpolymer as claimed in claim 1 wherein said nitrogen-containing organic compound is present in the form of its acid salt.

6. An interpolymer as claimed in claim 1 containing additionally from about 0.1 to 10 parts by weight, per 100 parts by weight of said ethylene and said vinyl acetate, of a low molecular weight copolymerized monomer, other than said ethylene and said vinyl acetate, having one ethylenic double bond and having less than 15 carbon atoms.

7. An interpolymer of ethylene and vinyl acetate comprising from about 25 to 10 parts by weight of ethylene and 75 to 90 parts by weight of vinyl acetate stabilized against discoloration upon heating containing homogeneously admixed therewith in an amount of from about 0.1 to 5 parts by weight per 100 parts by weight of said interpolymer of a carbamide compound selected from the group consisting of urea, dimethylol urea, dimethyl urea and phenyl urea.

8. An interpolymer of ethylene and vinyl acetate comprising from about 25 to 10 parts by weight of ethylene and 75 to 90 parts by weight of vinyl acetate stabilized against discoloration upon heating containing homogeneously admixed therewith in an amount of from about 0.1 to 5 parts by weight per 100 parts by weight of said interpolymer of a carbamamidine compound selected from the group consisting of guanidine, melamine, dicyandiamide, trimethylol melamine and semicarbazide.

9. An interpolymer of ethylene and vinyl acetate comprising from about 25 to 10 parts by weight of ethylene and 75 to 90 parts by weight of vinyl acetate stabilized against discoloration upon heating containing homogeneously admixed therewith in an amount of from about 0.1 to 5 parts by weight per 100 parts by weight of said interpolymer of a thiocarbamide compound selected from the group consisting of thiourea, dimethyl thiourea and dimethlol thiourea.

References Cited

UNITED STATES PATENTS

| | | | |
|---|---|---|---|
| 3,024,218 | 3/1962 | Stevens | 260—45.9 |
| 3,184,428 | 5/1965 | Hecker et al. | 260—41 |
| 3,190,763 | 6/1965 | Schleede et al. | 106—186 |
| 3,211,692 | 10/1965 | Hopkins et al. | 260—32.6 |
| 3,394,104 | 7/1968 | Hotten | 260—45.9 |
| 3,483,171 | 12/1969 | Kuhlkamp et al. | 260—80.6 |

HOSEA E. TAYLOR, Primary Examiner

RALPH A. WHITE, Assistant Examiner

U.S. Cl. X.R.

117—155; 156—334; 161—216, 250; 260—2.5, 29.6, 45.9, 897

PO-1050
(5/69)

UNITED STATES PATENT OFFICE
CERTIFICATE OF CORRECTION

Patent No. 3,549,589     Dated December 22, 1970

Inventor(s) Edmund R. Meincke

It is certified that error appears in the above-identified patent and that said Letters Patent are hereby corrected as shown below:

Column 9, first formula, the portion of the formula reading

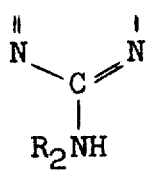    should read --- 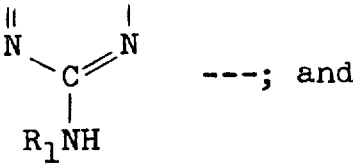 ---; and line 32, "thicarbamide" should read --- thiocarbamide ---.

Signed and sealed this 30th day of March 1971.

(SEAL)
Attest:

EDWARD M. FLETCHER, JR.           WILLIAM E. SCHUYLER, JR
Attesting Officer                     Commissioner of Patents